(12) United States Patent
Gaber et al.

(10) Patent No.: US 11,490,501 B1
(45) Date of Patent: Nov. 1, 2022

(54) DENSE PLASMA FOCUS APPARATUS

(71) Applicants: Janak H. Handa, Toronto (CA);
Hossam Gaber, North York (CA)

(72) Inventors: Hossam Gaber, North York (CA);
Vahid Damideh, Oshawa (CA); Sing Lee, Chadstone (AU)

(73) Assignees: Janak H. Handa, Toronto (CA);
Hossam Gaber, North York (CA)

( * ) Notice: Subject to any disclaimer, the term of this patent is extended or adjusted under 35 U.S.C. 154(b) by 0 days.

(21) Appl. No.: 17/723,170

(22) Filed: Apr. 18, 2022

(51) Int. Cl.
*H05H 1/48* (2006.01)
*H05H 3/06* (2006.01)

(52) U.S. Cl.
CPC .............. *H05H 1/481* (2021.05); *H05H 3/06* (2013.01)

(58) Field of Classification Search
CPC ............... H01J 37/3405; H01J 37/3408; H01J 37/32082; H01J 37/32706; H01J 37/3423; H01J 37/3266; H01J 37/3455; H01J 37/321; H01J 37/342; H01J 37/32623; H01J 37/34; H01J 37/3244; H01J 37/3458; H01J 37/32357; H01J 37/3402; H01J 2237/3327; H01J 37/32477; H01J 37/3441; H01J 37/3452; H01J 37/32091; H01J 37/32688; H01J 37/32724; H01J 37/32871; H01J 37/3426; H01J 37/3435; H01J 37/3447; H01J 37/3497; H01J 2237/0213; H01J 2237/0268; H01J 2237/2001; H01J 2237/335; H01J 37/32009; H01J 37/32596; H01J 37/32642; H01J 37/3438; H01J 37/3444; H01J 37/3461; H01J 37/347; H01J 37/3488; H01J 2237/0206; H01J 2237/0264; H01J 37/32018; H01J 37/32192; H01J 37/32422; H01J 37/32467; H01J 37/32495; H01J 37/3429; H01J 37/3467; H01J 37/32935; H01J 37/32926; H01J 49/105; H01J 49/0031; H01J 49/0004; H01J 49/0409; H01J 49/0459; H01J 49/0463; H01J 49/26; H01J 37/2174; H01J 37/32715; H01J 37/32146; H01J 37/32568; H01J 49/04; H01J 49/40; H01J 49/025; H01J 49/0027; H01J 49/0036; H01J 49/0404; H01J 49/0422; H01J 49/044; H01J 49/0445; H01J 49/0468; H01J 49/049; H01J 49/061; H01J 49/068; H01J 49/10;

(Continued)

(56) References Cited

U.S. PATENT DOCUMENTS

| 6,274,008 B1 * | 8/2001 | Gopalraja ........... H01J 37/3423 204/192.15 |
| 6,277,249 B1 * | 8/2001 | Gopalraja ......... H01L 21/76865 204/298.18 |

(Continued)

*Primary Examiner* — Monica C King
(74) *Attorney, Agent, or Firm* — Aird & McBurney LP

(57) ABSTRACT

In an aspect, a plasma focus apparatus produces pulsed high temperature plasma that emits multi-radiation including ion beams, electron beams, fast plasma streams, x-rays and nuclear fusion neutrons. This plasma focus apparatus includes an electrode assembly including an inner and at least one outer electrode, as well as a plurality of capacitors connected to the electrode assembly in parallel to form the high energy density, high current density plasma, where the arrangement and shape of the capacitors and other elements of the circuitry and electrode assembly provide a system with low stray inductance.

15 Claims, 8 Drawing Sheets

(58) Field of Classification Search
CPC .......... H01J 49/14; H01J 49/16; H01J 49/164; H01J 49/24; H01J 3/00; H01J 37/32128; H01J 37/32449; H01J 37/32541; H01J 49/0009; H01J 2237/3321; H01J 37/32; H01J 37/32532; H01J 37/32917; H01J 37/32954; H01J 49/142; H01J 17/40; H01J 2237/332; H01J 37/32055; H01J 37/32522; H01J 37/32633; H01J 37/32834; H01J 49/00; H01J 2237/327; H01J 2237/3322; H01J 27/16; H01J 37/32036; H01J 37/32045; H01J 37/32183; H01J 37/32458; H01J 37/32559; H01J 37/32614; H01J 37/32816; H01J 37/32972; H01J 49/145; H01J 1/304; H01J 17/063; H01J 17/066; H01J 17/494; H01J 2237/002; H01J 2237/022; H01J 2237/3142; H01J 2237/334; H01J 25/005; H01J 27/00; H01J 27/143; H01J 3/20; H01J 37/32256; H01J 37/32284; H01J 37/32513; H01J 37/32678; H01J 37/32743; H01J 37/32788; H01J 37/32825; H01J 37/32862; H01J 37/3299; H01J 37/3464; H01J 49/0418; H01J 49/0431; H01J 49/126; H01J 49/165; H01J 61/72; H01J 1/30; H01J 17/00; H01J 17/04; H01J 17/49; H01J 17/492; H01J 17/498; H01J 17/54; H01J 17/56; H01J 21/08; H01J 2201/30457; H01J 2237/006; H01J 2237/18; H01J 2237/3132; H01J 25/38; H01J 27/02; H01J 2893/0066; H01J 3/025; H01J 31/127; H01J 37/3053; H01J 37/3174; H01J 37/3233; H01J 37/32366; H01J 37/32403; H01J 37/32412; H01J 37/32669; H01J 37/32752; H01J 45/00; H01J 49/022; H01J 49/045; H01J 49/30; H01J 61/0672; H01J 61/125; H01J 61/28; H01J 65/04; H01J 65/042; H05H 1/46; H05H 1/38; H05H 1/42; H05H 1/463; H05H 2242/20; H05H 1/4622; H05H 2240/10; H05H 1/3431; H05H 1/466; H05H 2240/20; H05H 1/2406; H05H 1/34; H05H 1/48; H05H 1/24; H05H 1/4615; H05H 1/0037; H05H 1/246; H05H 1/461; H05H 1/4645; H05H 1/04; H05H 1/2431; H05H 1/3437; H05H 1/2443; H05H 1/2465; H05H 1/30; H05H 1/52; H05H 1/54; H05H 2242/24; H05H 2245/30; H05H 2245/34; H05H 2245/50; H05H 1/00; H05H 1/06; H05H 1/2418; H05H 1/26; H05H 1/28; H05H 1/32; H05H 1/3405; H05H 1/3468; H05H 1/36; H05H 1/40; H05H 1/44; H05H 1/4652; H05H 1/4697; H05H 1/47; H05H 2240/00; H05H 2242/00; H05H 2245/15; H05H 2245/40; H05H 7/04

See application file for complete search history.

(56) References Cited

U.S. PATENT DOCUMENTS

| | | | |
|---|---|---|---|
| 6,485,618 B2 * | 11/2002 | Gopalraja | H01J 37/3458 204/192.15 |
| 2010/0296989 A1 * | 11/2010 | de Souza | B03C 3/017 423/220 |

* cited by examiner

DENSE PLASMA FOCUS APPARATUS

FIELD OF THE DISCLOSURE

The present invention relates generally to plasma generating systems. In particular, the invention relates to a dense plasma focus apparatus.

BACKGROUND

Plasma focus systems are pinch-based, plasma generation systems in which the voltage of a charged capacitor is applied between two coaxial electrodes placed inside a vacuum chamber that is filled with a working gas. The application of the voltage from the charged capacitor leads to the ionization and breakdown of the working gas, and the formation of a current sheath spanning across the electrodes.

Under the effect of the Lorentz force created by the radial current flowing in the plasma and the current-induced azimuthal magnetic field, the current sheath that arcs between the electrodes is driven axially along the electrodes toward an open, focused end of the system, where the current sheath is radially compressed inwards to form a hot and dense pinched plasma column. During the pinching of the plasma, plasma instabilities lead to the emission of electron and ion beams, electromagnetic radiation pulses, and, if the working gas contains deuterium, fusion neutrons.

Regarding the function of the capacitors provided in plasma focus systems, the idealized energy stored inside the capacitor is proportional to the capacitance C at a constant applied voltage V. In the real capacitor elements, losses associated with the true performance of the capacitor include the losses from the stray inductance of the capacitor. Stray inductance is an essential phenomenon in any capacitor, and it cannot be avoided or controlled. Stray inductance reduces the capacity C of the capacitor and potential energy (U) storage in the capacitor. stray inductance increases with increasing the frequency of the applied potential.

In present generations of small-scale, plasma focus systems, the electrodes are typically charged by a single foil-wound capacitor, which is bulky, and which tend to have minimum stray inductances of at least 40 nH, thereby reducing the output of the capacitor and the resulting output of the plasma focus system. It is therefore desirable to provide a means by which the stray inductance of the plasma focus system is reduced, thereby increasing the actual, peak voltage applied by the pulse generating circuitry, and consequently increasing the output power of the plasma focus apparatus.

It is therefore an object of the invention to provide a novel plasma focus apparatus for generating pulsed plasmas at high temperature and high density, where the circuitry of the plasma focus apparatus has a reduced total stray inductance compared to other plasma focus apparatuses known in the art. The plasma focused apparatus as disclosed herein operates with an axial plasma phase followed by a plasma radial compression leading to a plasma pinch phase, where multi-radiations including x-rays and ion and electron beams are emitted from the plasma pinch.

SUMMARY OF THE DISCLOSURE

According to an aspect, there is provided a plasma focus apparatus comprising: a vacuum chamber, an electrode assembly including an inner electrode having a discharge end and a focus end, at least one outer electrode being disposed about the inner electrode, the at least one outer electrode and the inner electrode defining therebetween an annular ionization region for containing at least one working gas; and an insulator being disposed between the at least one outer electrode and the inner electrode. The plasma focus apparatus also includes a gas supply conduit for supplying the at least one working gas to the annular ionization region; and a pulsed power circuit including a spark gap switch being electrically connected to the inner electrode; and a plurality of capacitor elements being electrically connected in parallel between the at least one outer electrode and the spark gap switch, the spark gap switch and the plurality of capacitor elements being arranged to provide a pulsed discharge voltage between the inner electrode and the at least one outer electrode so as to ionize at least one working gas contained within the annular ionization region, the at least one outer electrode, the inner electrode and the insulator being relatively positioned such that when a pulse of discharge voltage is applied, an ionized working gas will form a plasma current sheath extending between the inner and at least one outer electrodes.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
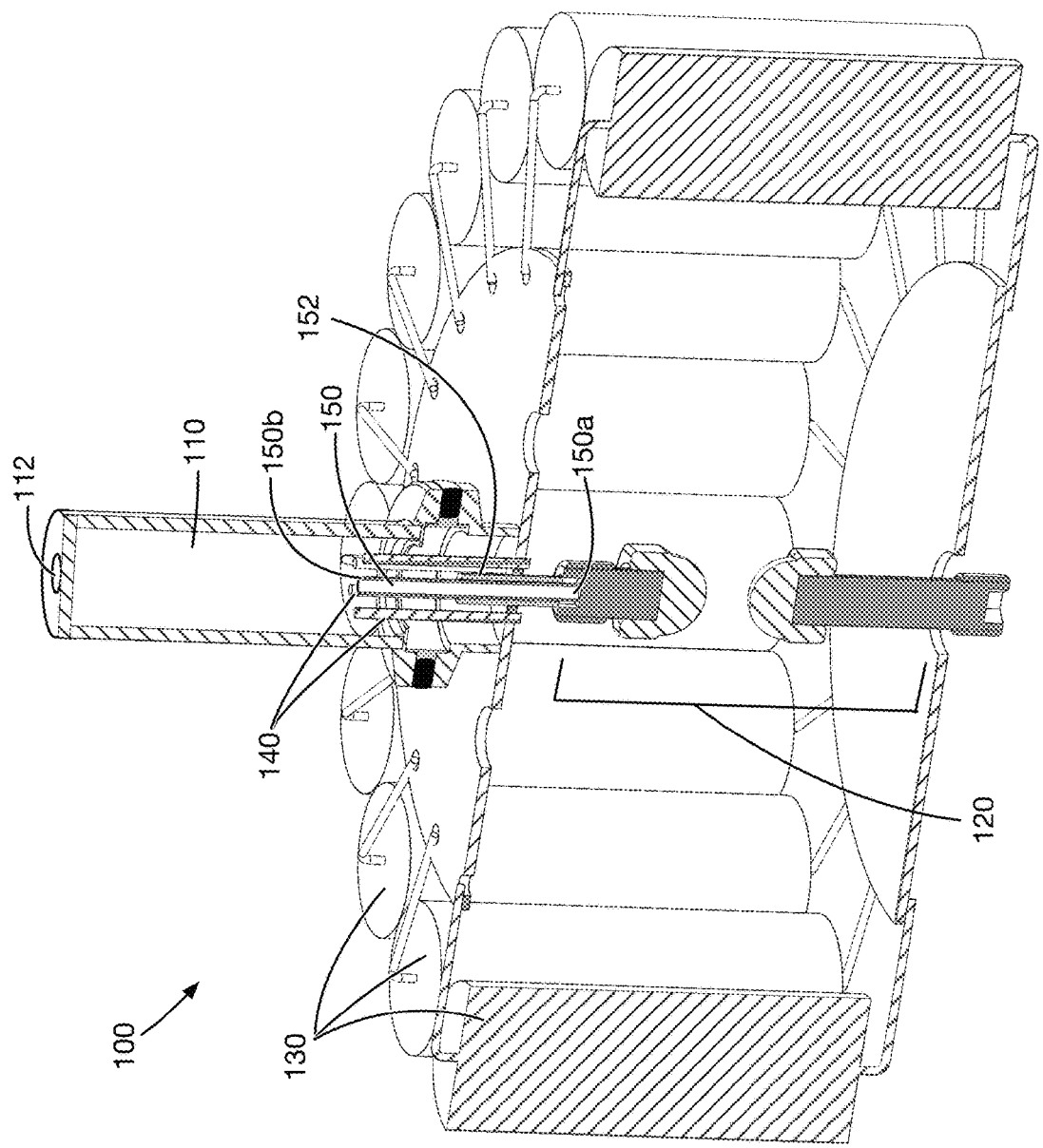
FIG. 1 shows an isometric, section-view of an embodiment of the plasma forming apparatus including the electrode assembly, the vacuum chamber and the pulsed power circuitry.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The indefinite article "a" is not intended to be limited to mean "one" of an element. It is intended to mean "one or more" of an element, where applicable, (i.e. unless in the context it would be obvious that only one of the element would be suitable).

Any reference to upper, lower, top, bottom or the like are intended to refer to an orientation of a particular element during use of the claimed subject matter and not necessarily to its orientation during shipping or manufacture. The upper surface of an element, for example, can still be considered its upper surface even when the element is lying on its side.

Figure 2:
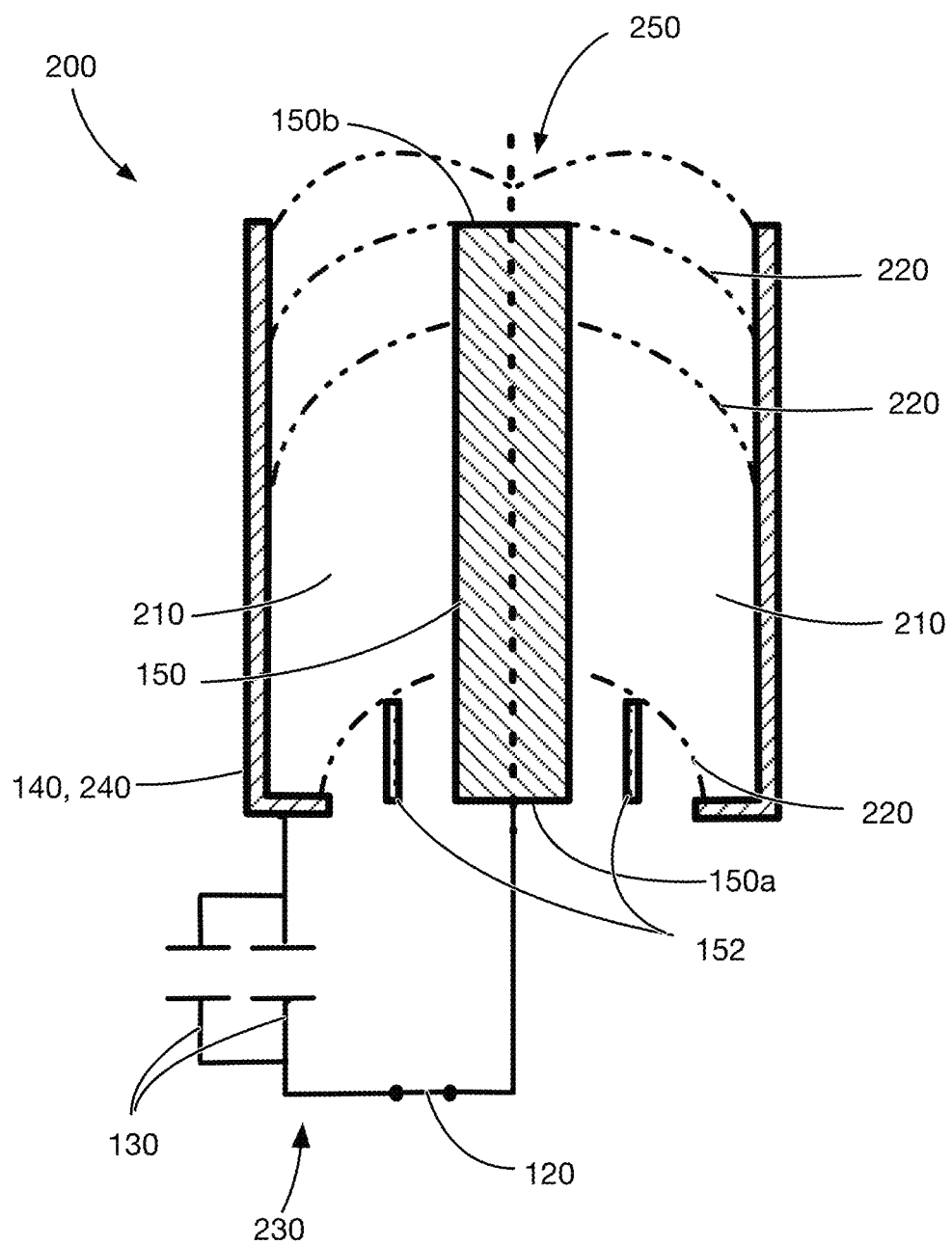
FIG. 2 shows a section view of an embodiment of the electrode assembly and pulsed power circuitry where the plasma current sheath has been generated within the electrode assembly.

Referring to FIG. 1 and FIG. 2, the plasma focus apparatus 100 comprises a vacuum chamber 100 and an electrode assembly 200, the electrode assembly 200 including an inner electrode 150 having a discharge end 150a and a focus end 150b, at least one outer electrode 140 being disposed about the inner electrode 150 and extending along at least a portion of the inner electrode 150, where the at least one outer electrode 140 and the inner electrode 150 define therebetween an annular ionization region 210 for containing at least one working gas, and where the electrode assembly 200 also includes an insulator 152 disposed between the at least one outer electrode 140 and the inner electrode 150.

The plasma focus apparatus also includes a gas supply conduit 112 for supplying the at least one working gas to the annular ionization region 210 within the vacuum chamber 110, and a pulsed power circuit 230 which includes a spark gap switch 120 being electrically connected to the inner electrode 150, and a plurality of capacitor elements 130 being electrically connected in parallel between the at least one outer electrode 140 and the spark gap switch 120, the spark gap switch 120 and the plurality of capacitor elements 130 being arranged to provide a pulsed discharge voltage between the inner electrode 150 and the at least one outer electrode 140 so as to ionize at least one working gas contained within the annular ionization region 210. Referring to FIG. 2, the at least one outer electrode 140, the inner electrode 150 and the insulator 152 are relatively positioned such that when a pulse of the pulsed discharge voltage is applied, the ionized working gas within the annular ionization region 210 will form a plasma current sheath 220 extending between the inner and at least one outer electrodes 150, 140.

In an embodiment, the plasma focus apparatus 100 is operated according to the following procedure:

An external power supply is provided to the pulsed power circuitry 230, including the spark gap switch 120 and the plurality of capacitor elements 130, where the external power supply is used to charge the plurality of capacitor elements 130. After a predetermined period of charging time, the plurality of capacitor elements 130 becomes at least partially charged by the external power supply.

Once the plurality of capacitor elements 130 are at least partially charged, the spark gap switch 120 is closed, allowing a discharge of the current stored in the plurality of capacitor elements 130. The discharge of current supplies a voltage across the at least one outer electrode 140 and the inner electrode 150, where the discharge voltage generates an arc between the at least one outer electrode 140 and the inner electrode 150 corresponding to each pulse of the pulsed voltage. In this embodiment, the arc generated within the annular ionization region 210 (between the inner electrode 150 and the at least one outer electrode 140) dilutes and ionizes the at least one working gas contained in the annular ionization region 210.

As shown in FIG. 2, as the at least one working gas becomes ionized and is continually provided in the annular ionization region 210 through the gas supply conduit 112 and the vacuum chamber 110, the inner electrode 150 is charged by each pulsed discharge of the plurality of capacitor elements 130 and will generate the arc of plasma at the path of least resistance of the annular ionization region 210, which is towards the discharge end 150a of the inner electrode 150. The arc from the inner electrode 150 forms the plasma current sheath 220 across to the at least one outer electrode 140. The plasma current sheath 220 will be driven along the annular ionization region 210, from the discharge end 150a to the focus end 150b of the inner electrode 150, where a pinch process of the plasma current sheath 220 will occur. The pinch process of the plasma current sheath 220 will cause the plasma current sheath 220 to radially collapses toward a long axis 250 of the inner electrode 150, where the collapsing plasma current sheath 220 form a dense plasma column at a output end of the electrode assembly 200.

The plasma focus apparatus 100 generally includes a gas supply conduit 112 for supplying the at least one working gas to the annular ionization region 210 of the electrode assembly 200. In an embodiment, the at least working gas supplied to the vacuum chamber 110 via the gas supply conduit 112 is a low-pressure gas or gas mixture at a pressure in a range from 0.1 Torr to 15 Torr.

In an embodiment, the at least one working gas is a variety of gases including, but not limited to, argon, nitrogen, deuterium and mixtures or combinations thereof.

In an embodiment, the at least one working gas is selected such that the plasma pinch process of the plasma current sheath 220 will generate and emit radiation. For example, the at least one working gas can be a gas or a gas mixture including one or more noble gases such as argon, krypton and xenon such that the pinch process will emit radiation. In an alternate embodiment, the at least one working gas is selected such that the plasma pinch process of the plasma current sheath 220 will generate and emit neutrons. For example, the at least one working gas can be a gas or a gas mixture including deuterium or a deuterium-tritium gas such that the pinch process will emit neutrons.

Vacuum Chamber and Conduit

Figure 3A:
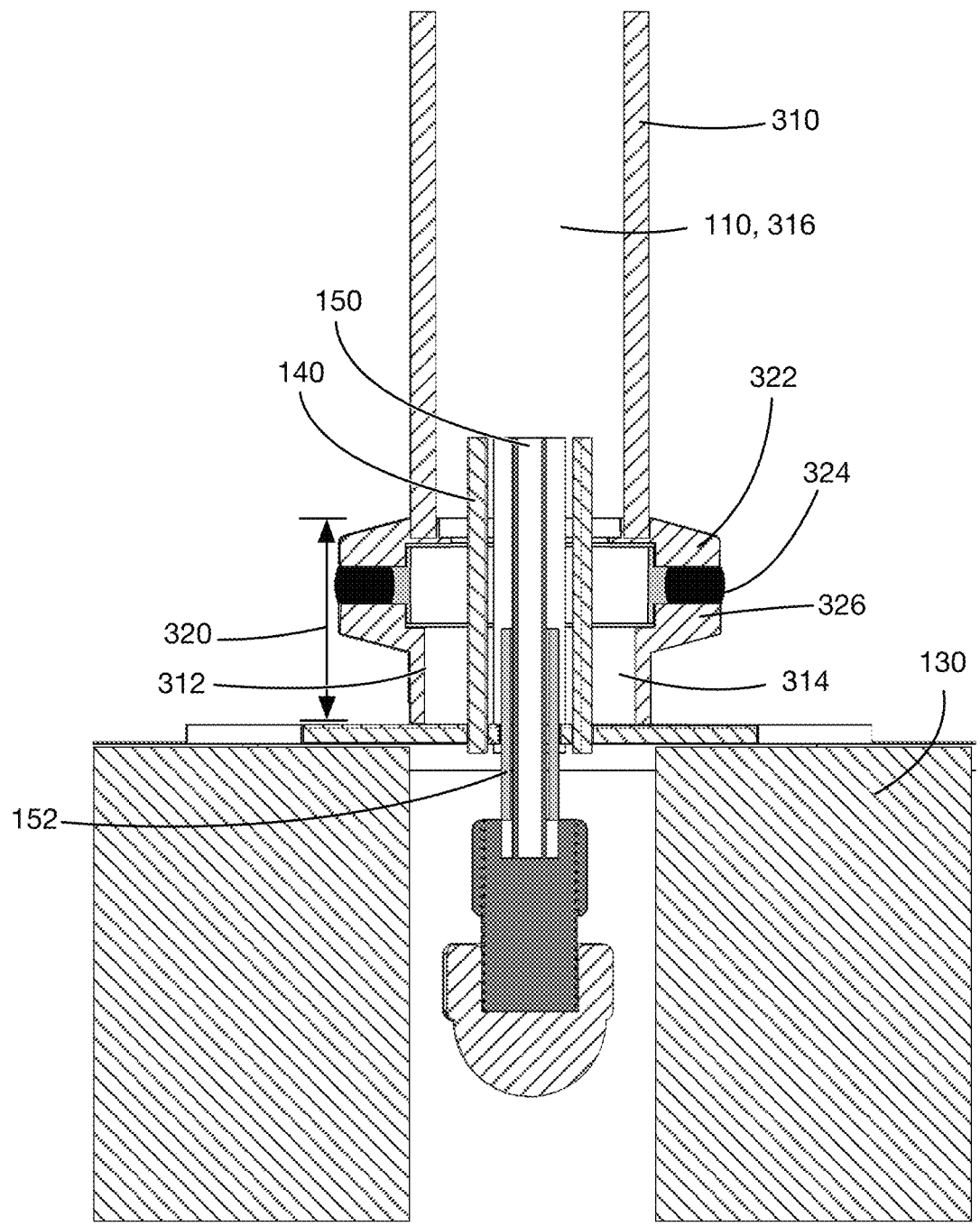
FIG. 3A shows a side, section-view of an embodiment of the plasma forming apparatus including the electrode assembly and its connection to the vacuum housing.
Figure 3B:
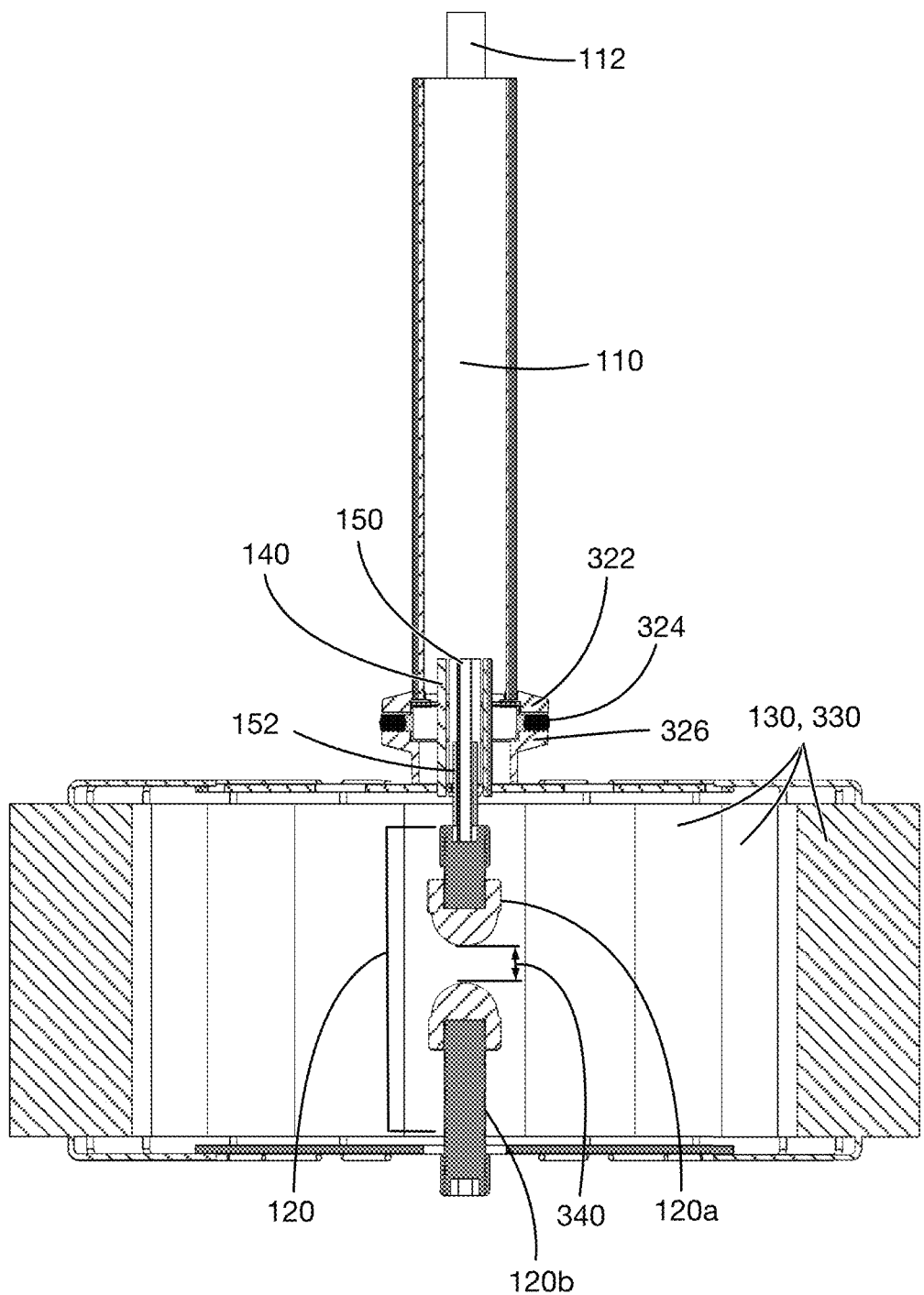
FIG. 3B shows a side, section-view of an embodiment of the plasma forming apparatus including the spark gap switch and the spark gap region.

In the specific embodiments provided in FIGS. 3A, 3B, 4 and 5, the plasma focus apparatus 100 includes a vacuum chamber 110 that is a tubular vacuum chamber. In the embodiment shown in FIG. 3A, the tubular vacuum chamber has a top chamber portion 316 and a bottom chamber portion 314. The top chamber portion 316 is defined within a tubular housing 310, where the tubular housing 310 is mounted to a retaining structure 320 with a through-aperture 312 that defines the bottom chamber portion 314. As shown in FIGS. 3A and 3B, the retaining structure 320 can include a pair of annular flanges 322, 326 on which the tubular housing 310 is mounted, as well as an O-ring 324 for providing a vacuum seal between the annular flanges 322, 326 to prevent leakage of the at least one working gas from the vacuum chamber 110. In the embodiment shown, the through-aperture 312 that defines the bottom chamber portion 314 is provided in the bottom flange of the pair of annular flanges 322, 326.

In the specific embodiment provided in FIG. 3B, a top end of the tubular housing 310 is in fluid connection with the gas supply conduit 112 for injection therethrough of the at least one working gas. The gas supply conduit 112 can also be used as an evacuation conduit for evacuating air from the vacuum chamber 110 to produce a vacuum pressure. In an alternate embodiment, the tubular housing can include an evacuation conduit in fluid connection with the vacuum chamber, where the evacuation conduit is separate from the gas supply conduit 112.

In an embodiment, the plasma focus apparatus 100 includes a vacuum pump that is in fluid connection with the evacuation conduit (either as part of the gas supply conduit 112 or as a separate evacuation conduit), where the vacuum pump is sized to evacuate gas from the vacuum chamber 110 so as to produce a vacuum pressure therewithin. The vacuum pump may be a variety of suitable vacuum pumps for evacuating gases including a rotary vane vacuum pump, a diaphragm vacuum pump, a liquid ring vacuum pumps and a scroll vacuum pump.

Figure 4:
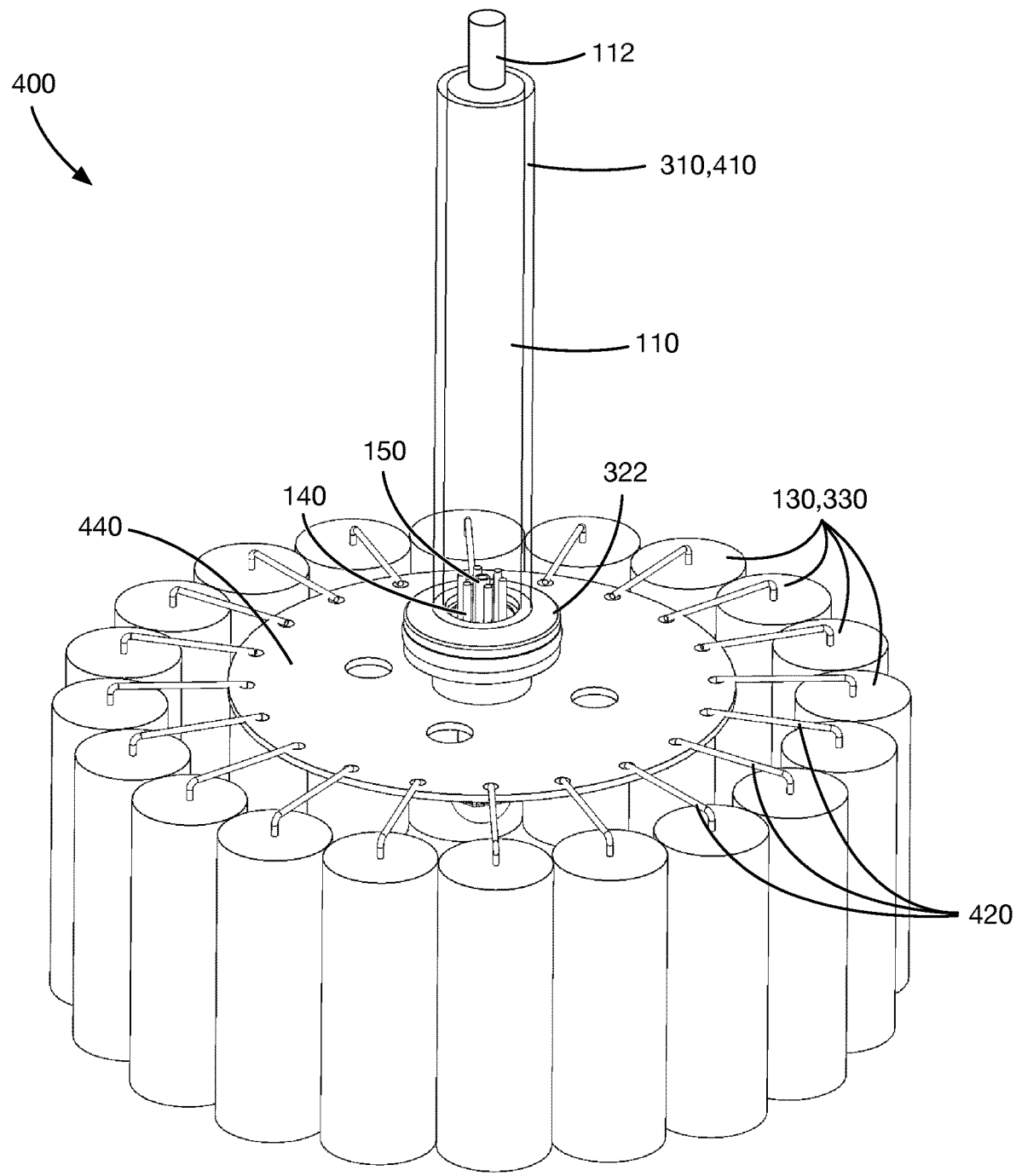
FIG. 4 shows an isometric view of an embodiment of the plasma forming apparatus including twenty cylindrical capacitors connected in parallel between first and second collector discs of the apparatus.

In the embodiment shown in FIG. 4, the tubular housing 310 is an at-least-partially transparent housing 410. In an additional embodiment, the material of the at-least-partially housing 410 is a glass or glass mixture including a quartz glass component. The transparent property of the at-least-partially transparent housing 410 provides a means for non-invasively accessing the interior of the vacuum chamber 110 during the plasma formation process so that optical measurements may be performed to characterize at least a first property of the plasma arc generated from the electrode assembly 200. The optical measurements may be an imaging analysis or a spectroscopic analysis of the plasma arc. The optical measurement may also be an ion or electron beam time-of-flight measurement.

While the present disclosure describes a vacuum chamber 110, it will be readily understood that the pressures within the reaction chamber need not be a perfect vacuum.

Electrode Assembly

As disclosed herein, the electrode assembly 200 includes an inner electrode 150 that has a discharge end 150a and a focus end 150b, at least one outer electrode 140 that is disposed about the inner electrode 150, and an insulator 152 disposed between the at least one outer electrode 140 and the inner electrode 150.

In an embodiment, the at least one outer electrode 140 defines the cathode of the electrode assembly 200, and the inner electrode 150 defines the anode of the electrode assembly 200.

Figure 6:
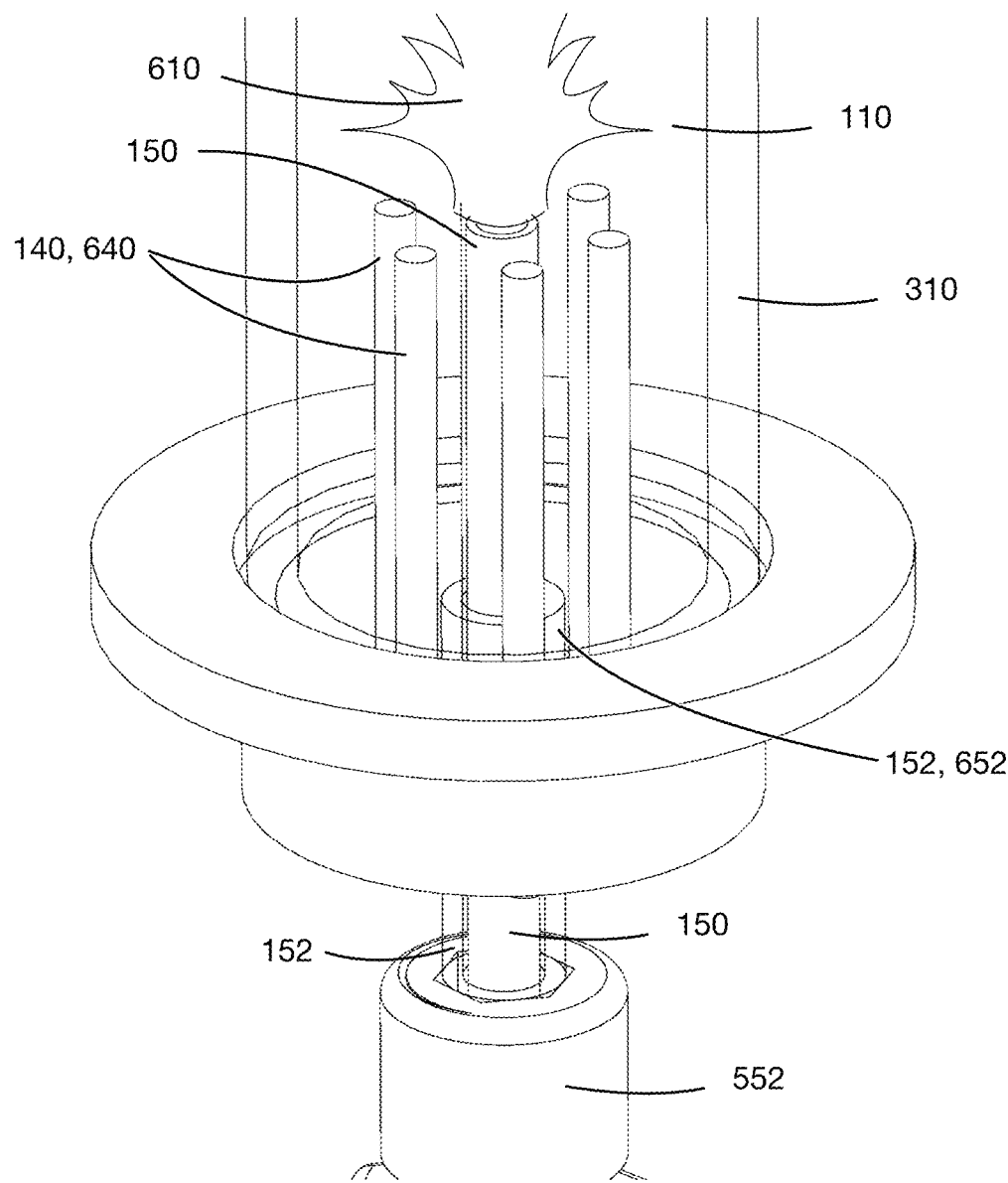
FIG. 6 shows an embodiment of the electrode assembly mounted within a transparent vacuum housing and generating a plasma arc.

Referring to FIGS. 6, an embodiment of the plasma focus apparatus 100 is shown, where the at least one outer electrode 140 extends along at least a portion of the inner electrode 150, where the at least one outer electrode 140 and the inner electrode 150 define therebetween the annular ionization region 210 for containing at least one working gas. Within the electrode assembly 200, the at least one outer electrode 140, the inner electrode 150 and the insulator 152 are relatively positioned such that when a pulse of discharge voltage is applied to the inner electrode 150 and at least one outer electrode 140, the ionized working gas will form a plasma current sheath extending between the inner and at least one outer electrodes 150, 140.

As discussed, the at least one outer electrode 140 is disposed about the inner electrode 150, with a gap therebetween that defines the annular ionization region 210. The at least one outer electrode 140 can be various numbers of suitably shaped electrodes. In an embodiment, the at least one outer electrode 140 is a plurality of identical outer electrodes that are symmetrically disposed about the inner electrode. The plurality of outer electrodes may be symmetrically disposed about the inner electrode 150 in a circular pattern. The number of the at least one outer electrode 140 and the distance between outer electrodes (in embodiments where the at least one outer electrode 140 is a plurality of electrodes) can be selected based on a total capacitance of the plurality of capacitor elements 130 or a total stray inductance of the plurality of capacitor elements 130 and spark gap switch 120 such that a stray inductance of the electrode assembly 200 is minimized. In the specific embodiment provided in FIG. 6, the at least one outer electrode 140 is six outer electrode rods 640, where each outer electrode rod 640 is symmetrically disposed about the inner electrode 150 in a circular arrangement to define a radial dimension of the annular ionization region 210. In an additional embodiment, each of the outer electrode rods 640 are spaced radially outwards from the inner electrode 150 at a distance of at least 3 mm.

In an embodiment of the electrode assembly 200 such as the embodiment provided in FIG. 2, the at least one outer electrode 140 is a single, tubular electrode that is disposed concentrically about the inner electrode.

The insulator 152 is provided in the electrode assembly 200 to prevent undesired arcing or discharge of current between the inner electrode 150 and the at least one outer electrode 140 in certain regions along the electrode assembly 200. In an embodiment such as the embodiment provided in FIG. 6, the insulator 152 disposed between the at least one outer electrode 140 and the inner electrode 150 is a tubular insulator 652 that is coaxially disposed between the at least one outer electrode 140 and the inner electrode 150 and extends from the discharge end of the electrode assembly, along a portion of the length of the inner electrode 150. The insulator 152 can be disposed between the at least one outer electrode 140 and the inner electrode 150 such that it is in contact with one, both or none of the at least one outer electrode 140 and the inner electrode 150.

In an embodiment, the insulator 152 is composed of one or more electrically insulating materials. For example, the insulator may be composed of an insulating ceramic material like quartz glass.

In the specific embodiment of FIG. 6, the inner electrode 150 is a tubular inner electrode 150, the insulator 152 is a tubular insulator 652 that surrounds a lower portion of the tubular inner electrode 150, and the outer electrode 140 is the six outer electrode rods 640. In this embodiment, the tubular inner electrode 150 and the tubular insulator 652 are directly mounted to the spark gap switch 120 such that at least a portion of the tubular inner electrode 150 and a portion of the tubular insulator 652 each extend along at least a portion of the vacuum chamber 110.

In an embodiment, the at least one outer electrode 140 and the inner electrode 150 are composed of a conductive material including aluminum, copper, beryllium, chromium, copper, gold, nickel, molybdenum, palladium, platinum, silver, tantalum, titanium, tungsten, and zinc) and alloys thereof (e.g., copper-alloy, beryllium-alloy, copper-beryllium-alloy, aluminum-alloy and other metal alloys). The at least one outer electrode 140 and the inner electrode 150 may be composed of the same conductive material or different conductive materials.

Pulsed Power Circuit

The plasma focus apparatus 100 includes the pulsed power circuitry 230 for controlling the pulse discharge voltage applied to the electrode assembly. As shown in FIGS. 1 and 2, the pulsed power circuitry 230 includes the plurality of capacitor elements 130 and the spark gap switch 120.

In an embodiment, the plurality of capacitor elements 130 are electrically connected in parallel between the at least one outer electrode 140 and the spark gap switch 120. The spark gap switch 120 is connected between the plurality of capacitor elements 130 and the inner electrode 150. The spark gap switch 120 and the plurality of capacitor elements 130 are arranged to provide the pulsed discharge voltage between the inner electrode 150 and the at least one outer electrode 140 so as to ionize at least one working gas contained within the annular ionization region 210.

In an embodiment, the plurality of capacitor elements 130 are connected to the spark gap switch 120 and the at least one outer electrode 140 and are symmetrically disposed around the electrode assembly 200. In an additional embodiment of the plasma focus apparatus 100 including the symmetrically disposed, plurality of capacitor elements 130, the plurality of capacitor elements 130 are disposed about the electrode assembly in a circular arrangement.

In a specific embodiment where the inner electrode 150 is an inner electrode rod, the plurality of capacitor elements 130 are disposed in a circular arrangement such that the circular arrangement is concentric with the inner electrode rod.

In an embodiment, each of the plurality of capacitor elements 130 is a high-voltage, thin-film capacitor in a range from 3 kVdc to 30 kVdc.

In the specific embodiment provided in FIG. 4, the plurality of capacitor elements 130 are at least twenty cylindrical, thin-film capacitors 330 that are symmetrically disposed about the inner electrode 150. In this embodiment, the at least twenty capacitors 330 are arranged symmetrically, in a circular pattern relative to the inner electrode 150.

In the embodiments where the plurality of capacitors elements 130 is at least twenty capacitors, each of the at least twenty capacitors of the plurality of capacitor elements 130 may be a 10 kV miniature-film capacitor with a capacitance of 0.1 uF and individual stray inductances of 100 nH. When the plurality of capacitors elements 130 are exactly twenty 0.1 uF capacitors arranged in parallel and connected in parallel between the at least one outer electrode 140 and the spark gap switch 120, the twenty cylindrical capacitors have a total capacitance of 2 uF and a total stray inductance of 5 nH. Although this embodiment specifically describes a plasma focus apparatus 100 with twenty capacitors, it will be readily understood that the number and sizing of the plurality of capacitor elements 130 in the plasma focus apparatus 100 may be various amounts. For example, the number of capacitor elements 130 may be fifty 10 kV, miniature-film capacitors with a total stray inductance (in parallel) of 2 nH, or the number of capacitor elements 130 may be one-hundred 10 kV capacitors with a total stray inductance (in parallel) of 1 nH.

In an embodiment, the number of capacitors provided in the plurality of capacitor elements 130 is the minimum number of capacitor elements 130 which can provide a sufficiently large voltage to produce arc discharge between the at least one outer and the inner electrodes 140, 150. In this embodiment, the number of capacitor elements 130 may also be selected to achieve a stray inductance within the pulsed power circuitry 230 that is below a predetermined value of stray inductance, where the achieving a stray inductance below the predestined value of stray inductance will result in the pulsed power circuitry 230 providing a greater magnitude of discharge current through the discharge voltage.

In an additional embodiment, as more capacitors are included within the apparatus 100 as part of the plurality of capacitor elements 130, the total capacitance of the pulsed power circuitry 230 will increase, as will the resulting discharge current. As the total capacitance is increased, the pressure of the at least one working gas and the length of the inner electrode 150 can also be adjusted to optimize the output power of the plasma discharge from the plasma focus apparatus 100.

Referring to the specific embodiment provided in FIG. 3B, the spark gap switch 120 includes a switching electrode 120a to which the plurality of capacitor elements 130 are connected, in parallel. The spark gap switch 120 also includes a switched electrode 120b that is disposed opposite the switching electrode 120a to define a spark gap 340 therebetween. In the specific embodiment provided in FIG. 5, each of the switching and switched electrodes 120a, 120b include a conductive, mounting body 552, 558, and a hemispherical electrode portion 554, 556. The hemispherical electrode portions 554, 556 of the switching and switch electrodes 120a, 120b provide the spark discharge therebetween. Each of the hemispherical electrode portions 554, 556 are mounted on the conductive mounting bodies 552, 558. The conductive mounting body 558 of the switching electrode 120a is conductively connected to the plurality of capacitor elements 130, while the conductive mounting body 552 of the switched electrode 120b is conductively connected to the inner electrode 150. In an embodiment, the hemispherical electrode portions 554, 556 of each of the switching and switched electrodes 120a, 120b are removably mountable to their respective conductive, mounting bodies 552, 558. In the specific embodiment of FIG. 5, the hemispherical electrode portions 554, 556 and conductive mounting bodies 552, 558 have sets of corresponding threads for providing the removable mounting the hemispherical electrode portions 554, 556 thereon.

Figure 5:
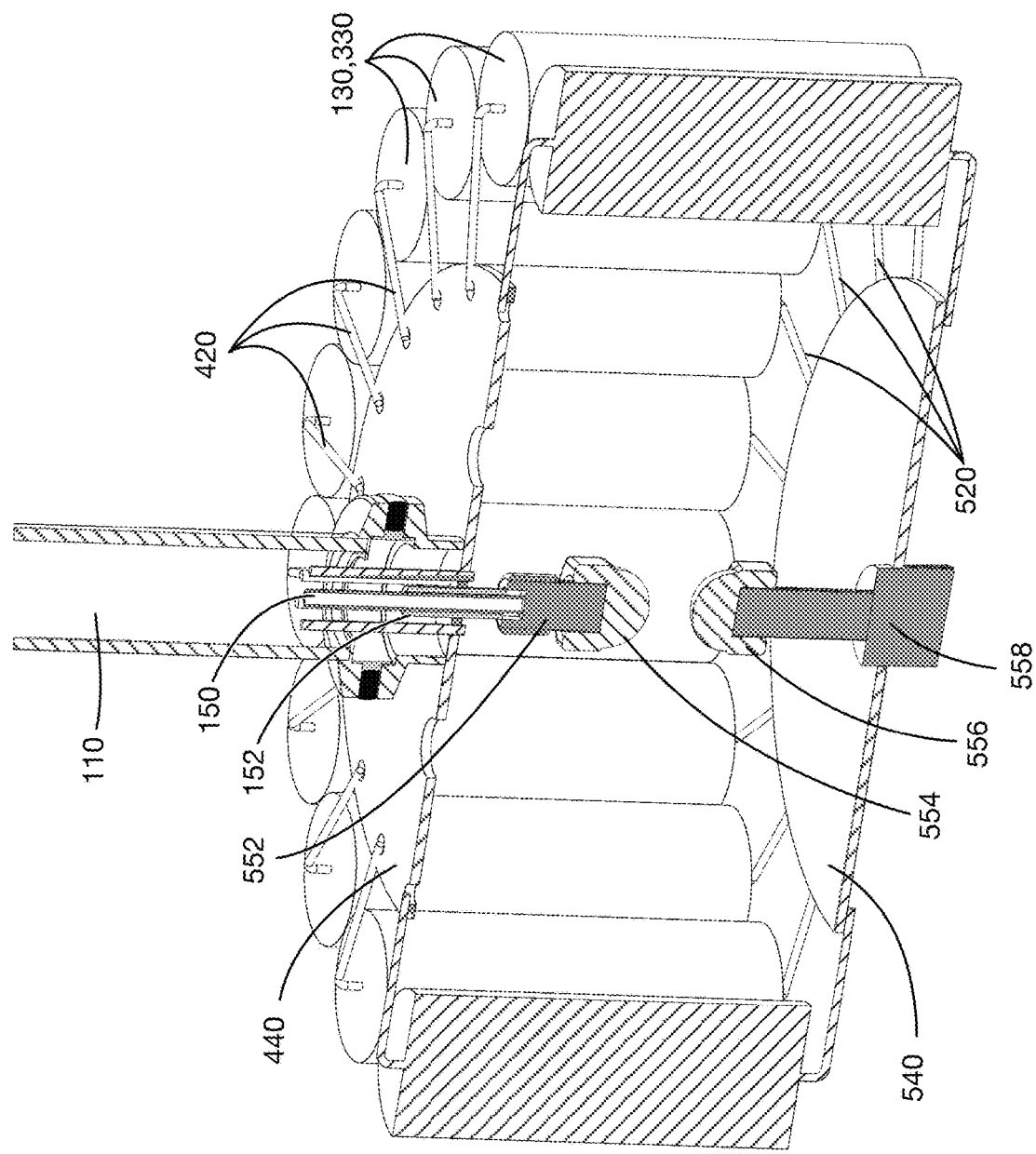
FIG. 5 shows a side, section-view of an embodiment of the plasma forming apparatus including the components of the spark gap switch.

In the specific embodiment of FIG. 5, the switched electrode 120b is directly connected to the inner electrode 150 of the electrode assembly, while the switching electrode 120a is mounted on the second collector disc 540. The switching and switched electrodes 120a, 120b are relatively and opposingly disposed along the long axis 250 of the inner electrode 150 such that the spark gap 322 is defined along the long axis of the plasma focus apparatus 100, between the hemispherical electrode portions 554, 556.

Conduction Assemblies

In an embodiment, the spark gap switch 120, plurality of capacitor elements 130, and outer electrode 140 are electrically connected, in the configuration presented above, via first and second conductive assemblies. In this embodiment, the at least one outer electrode 140 is electrically connected to the plurality of capacitor elements 130 via the first conductive assembly, and the spark gap switch 120 is electrically connected to the plurality of capacitor elements 130 via the second conductive assembly.

In an embodiment, the first conductive assembly includes a first collector plate to which the at least one outer electrode 140 is mounted, and a first plurality of conductive conduits corresponding to the plurality of capacitor elements 130. Each of the first plurality of conductive conduits are connected to the first collector plate and to a first end of one of the plurality of capacitor elements 130. In this embodiment, the first collector plate includes an internally disposed through-opening for pass therethrough of a portion of the insulator 152 and the inner electrode 150.

In an embodiment, the second conductive assembly includes a second collector plate that is electrically connected to the spark gap switch 120, and a second plurality of conductive conduits corresponding to each of the plurality of capacitor elements 130, each of the second plurality of conductive conduits being connected to the second collector plate and to a second end of one of the plurality of capacitor elements 130.

In this embodiment, a central axis of the inner electrode 150 defines a central axis of the plasma focus apparatus 100. In this embodiment, the first and second collector plates are spaced apart along the central axis of the plasma focus apparatus 100, where the space between the first and second collector plates defines a spark region. The spark gap switch 120 is disposed in the spark gap region, between the first and second collector plates. In a specific embodiment shown in FIG. 5, the spark gap switch 120 is oriented within the spark gap region to extend along the long axis 250 of the inner electrode 150.

In the specific embodiment shown in FIGS. 4 and 5, the first and second collector plates are first and second collector discs 440, 540. The first collector disc 440 includes a centrally disposed through-opening for pass therethrough of a portion of the electrode assembly 200. The outer electrode 140 rods are mounted through the first collector disc 440 and are arranged symmetrically around the centrally disposed through-opening, in a circular pattern. The second collector disc 540 is formed such that the spark gas switch 130 can be mounted thereon. In the exemplary embodiment provided in FIG. 5, a portion of the spark gas switch 130 is mounted in a through-hole provided in the second collector disc 540. The first-and second-collector discs 440, 540 are connected, via the first and second plurality of conductive conduits 420, 520, to opposing ends of individual capacitor elements of the plurality of capacitor elements 130. In an embodiment such as the embodiment provided in FIG. 5, the first and second plurality of conductive conduits 420, 520 are connected around an outer region of each of the first and second collector discs 440, 540, and extend radially outward from each of the first and second collector discs 440, 540 to connect to opposing ends of the plurality of capacitor elements 130.

Each of the first and second plurality of conductive conduits 420, 520 may be connected to the first and second collector discs 440, 540 by various means. In an embodiment, the first and second collector discs 440, 540 each include a plurality of conduit fastener elements disposed around the outer region of each of the first and second collector discs 440, 540. Each of the conduit fastener elements are shaped to releasably secure an end of each of the first and second plurality of conductive conduits 420, 520 thereto. In an embodiment, the conduit fastener elements are metal nuts threaded through the first and second collector discs 440, 540.

In an embodiment, the first and second collector plates and the first and second plurality of conductive conduits are composed of a conductive material including, but not limited to copper, chromium, steel and nickel, or alloys and combinations thereof. In an alternate embodiment, the collector plates and conductive conduits are composed of at least two different, conductive materials including, but not limited to copper, chromium, steel and nickel, or alloys and combinations thereof. The first and second collector plates and the first and second plurality of conductive conduits may be composed of the same conductive material or, some or all of the first and second collector plates and the first and second plurality of conductive conduits may each be composed of different conductive materials.

In a specific embodiment of the plasma focus apparatus 100 presented in FIG. 5, the first and second collector discs 440, 540 are each formed of pure copper, and have a total stray inductance of 10 nH. In this embodiment, the spark gap switch 120 has a 25 nH stray inductance, and the plurality of capacitor elements 130 are twenty, 0.1 uF capacitors, thin-film, cylindrical capacitors. In this embodiment, the first and second collector discs 440, 540, spark gap switch 120 and plurality of capacitor elements 130 have a combined, total inductance value of 40 nH.

Power Supply

In an embodiment, the plasma focus apparatus 100 further comprises an external power source connected to one of the at least one outer electrode 140, the first collector plate, and one of the first plurality of conductive conduits, where the external power source will provide a discharge voltage to the plurality of capacitor elements 130. The discharge voltage provided by an external power source has a sufficiently large voltage to produce an electrical discharge between the between the at least one outer electrode 140 and the inner electrode 150 of the electrode assembly 200.

In an embodiment, the peak voltage of the discharge voltage applied by the external power source to the pulsed power circuitry 230 is in a range from 5v to 15 kV. In an specific embodiment, the power supplied by the external power source has a 10 kV peak output voltage and provides a 5 mA constant current.

Gas Supply System

In an embodiment, the plasma focus apparatus 100 includes a gas supply system 700 in fluid connection with the gas supply conduit 112. The gas supply system 700 is connected to the gas supply conduit 112 to provide the at least one working gas to the vacuum chamber 110, and to control at least one of: a rate of evacuation of the vacuum chamber 110, a rate of injection for the at least one working gas, a pressure of the at least one working gas, or a composition of the at least one working gas injected into the vacuum chamber 110.

Figure 7:
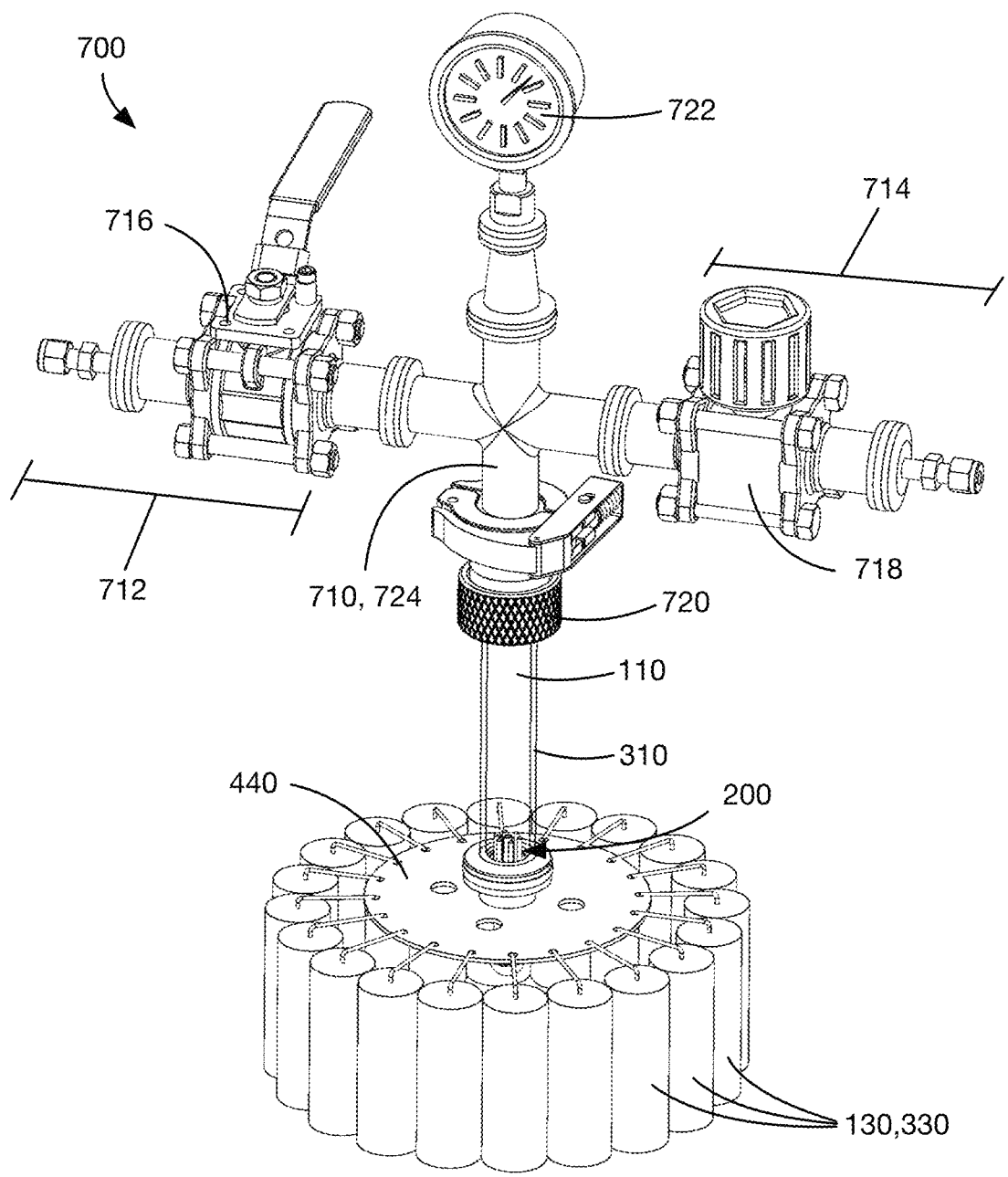
FIG. 7 shows an isometric view of an embodiment of the plasma focus apparatus, where the plasma focus apparatus is in fluid connection with a gas supply system.

In the specific example provided in FIG. 7, a section of an exemplary gas supply system 700 is shown. The section of the gas supply system 700 includes a distribution conduit 710 in fluid connection with the gas supply conduit 112. The distribution conduit 710 includes at least one inlet 714 for connecting the distribution conduit 710 to a source of the at least one working gas. In the specific embodiment presented in FIG. 7, the distribution conduit 710 is a T-joint conduit 724 directly mounted on the gas supply conduit 112 via an adapter fitting 720. The T-joint conduit 724 of the gas supply system 700 includes a working gas valve 718 connected along the first inlet 714 of the T-joint conduit 724 to control a rate of injection of the at least one working gas through the gas supply conduit 112. The T-joint conduit 724 also includes a second inlet 712 and a vacuum control valve 716 connected along the second inlet 712. The vacuum control valve 716 controls the evacuation of gas from the vacuum chamber 110, through the distribution conduit 710 and the second inlet 712 when the vacuum pump is turned on, to thereby regulate an evacuation rate of the vacuum chamber 110.

In an embodiment, the gas supply system 700 also includes a gauge 722 to monitor a gaseous pressure in the gas supply system 700. In the specific example provided in FIG. 7, the gauge 722 is a dial gauge, but the gauge 722 could be any suitable gauge for reading a pressure of a gas flowing through a distribution conduit 710.

EXAMPLES

Example 1

In a non-limiting example of the sizing and operation of the plasma focus apparatus 100 disclosed herein, the plasma focus apparatus 100 includes a plurality of parallel capacitors with a total stray inductance of 5 nH, the plurality of parallel capacitors being connected to a spark gap switch 120 with a 25 nH stray inductance and to a pair of collector plates, each with a 5 nH stray inductance. This example of the plasma focus apparatus 100 has a total stray inductance of 40 nH. When a pulsed voltage with a peak operating voltage of 10 kV is applied between the at least one outer and the inner electrode 150 of the exemplary plasma focus apparatus 100, the low total stray inductance enables the peak discharge, short-circuit current amplitude of the plurality of parallel capacitor to be at least 70 kA. (the short circuit current amplitude being calculated using the formula $V/(L/C)^{0.5}$.

Example 2

In a non-limiting example of the sizing and operation of the plasma focus apparatus 100 disclosed herein, the plasma focus apparatus 100 includes a plurality of parallel capacitors with a total stray inductance of 5 nH, the plurality of parallel capacitors being connected to a spark gap switch 120 with a 25 nH stray inductance and to a pair of collector plates, each with a 5 nH stray inductance. This example of the plasma focus apparatus 100 has a total stray inductance of 40 nH. When a pulsed voltage with a peak operating voltage of 6 kV is applied between the at least one outer and the inner electrode 150 of the exemplary plasma focus apparatus 100, the low total stray inductance enables the peak discharge, short-circuit current amplitude of the plurality of parallel capacitor to be at least 42 kA. (the short circuit current amplitude being calculated using the formula $V/(L/C)^{0.5}$.

In an embodiment, the plasma focus apparatus 100 as disclosed herein is used for radiation generation. In this embodiment, the at least one working gas includes a noble gas such as argon, krypton and xenon. The ionization, plasma formation and plasma pinching within this embodiment of the plasma focus apparatus 100 will emit radiation from the plasma discharge at the long axis 250 of the inner electrode 150.

Example 3

In an exemplary embodiment of the plasma focus apparatus 100 applied to generate radiation, the at least one outer electrode 140 is a single, tubular electrode having an inner diameter of 11 mm, the inner electrode 150 is a concentric electrode rod having an outer diameter of 3.5 mm and a length of 20 mm. In this example, the at least one working gas is Argon gas supplied at a pressure of 0.9 Torr. In this example, the power supply connected to the first collector plate provides a pulsed voltage with a 6 kV peak operating voltage to the pulsed power circuitry 230. The resulting current has a current linear density of 205 kA/(cm of at inner electrode 150 radius) and the speed factor (S) is 216 (kA/cm)Torr$^{0.5}$. The resulting Argon all-line radiation peak power is 1.7 MW and the integrated all-line radiation yield is 1.5 mJ.

In an embodiment, the plasma focus apparatus 100 as disclosed herein is used for neutron generation. In this embodiment, the at least one working gas is one of deuterium gas, or a gas mixture of deuterium and argon. The ionization, plasma formation and plasma pinching within this embodiment of the plasma focus apparatus 100 will generate a beam of neutrons from the plasma discharge at the long axis 250 of the inner electrode 150.

Example 4

In an exemplary embodiment of the plasma focus apparatus 100 applied to produces neutron beams, the at least one outer electrode 140 is a single tubular electrode having an inner diameter of 11 mm, the inner electrode 150 is a concentric electrode rod having an outer diameter of 3.5 mm and a length of 20 mm. In this example, the at least one working gas is deuterium supplied at a pressure of 12 Torr. In this example, the power supply connected to the first collector plate provides a pulsed voltage with a 10 kV peak operating voltage to the pulsed power circuitry 230. The resulting current is 58 kA with a current linear density 331 kA/(cm of anode radius) and the speed factor S=is 96 (kA/cm)Torr$^{0.5}$. The resulting nuclear fusion neutron yield is $1.5 \times 10^4$ neutrons per shot.

The above-described embodiments are intended to be examples of the present invention and alterations and modifications may be effected thereto, by those of skill in the art, without departing from the scope of the invention that is defined solely by the claims appended hereto.

What is claimed is:

1. A plasma focus apparatus comprising:
   a vacuum chamber;
   an electrode assembly including:

an inner electrode having a discharge end and a focus end;

at least one outer electrode being disposed about the inner electrode, the at least one outer electrode and the inner electrode defining therebetween an annular ionization region for containing at least one working gas; and an insulator being disposed between the at least one outer electrode and the inner electrode;

a gas supply conduit for supplying the at least one working gas to the annular ionization region; and a pulsed power circuit including:

a spark gap switch being electrically connected to the inner electrode; and a plurality of capacitor elements being electrically connected in parallel between the at least one outer electrode and the spark gap switch, the spark gap switch and the plurality of capacitor elements being arranged to provide a pulsed discharge voltage between the inner electrode and the at least one outer electrode so as to ionize at least one working gas contained within the annular ionization region, the at least one outer electrode, the inner electrode and the insulator being relatively positioned such that when a pulse of discharge voltage is applied, an ionized working gas will form a plasma current sheath extending between the inner and at least one outer electrodes.

2. The plasma focus apparatus of claim 1, wherein the at least one outer electrode is a plurality of electrodes symmetrically disposed about the inner electrode.

3. The plasma focus apparatus of claim 1, wherein the at least one outer electrode is a single, tubular electrode, concentrically disposed about the inner electrode.

4. The plasma focus apparatus of claim 1, wherein the inner electrode extends along at least a portion of the vacuum chamber, and the insulator and the at least one outer electrode extend along at least a portion of the inner electrode.

5. The plasma focus apparatus of claim 1, further comprising an external power source connected to the at least one outer electrode for providing a discharge voltage to the plurality of capacitors, the discharge voltage provided by the external power source being sufficiently large to produce an electrical arc discharge between the at least one outer electrode and the inner electrode.

6. The plasma focus apparatus of claim 1, wherein the at least one outer electrode is electrically connected to the plurality of capacitor elements via a first conductive assembly, the first conductive assembly including:

a first collector plate to which the at least one outer electrode is mounted; and a first plurality of conductive conduits corresponding to the plurality of capacitor elements, each of the first plurality of conductive conduits being connected to the first collector plate and to a first end of one of the plurality of capacitor elements; and wherein the spark gap switch is electrically connected to the plurality of capacitor elements via a second conductive assembly, the second conductive assembly including:

a second collector plate that is electrically connected to the spark gap switch; and a second plurality of conductive conduits corresponding to each of the plurality of capacitor elements, each of the second plurality of conductive conduits being connected to the second collector plate and to a second end of one of the plurality of capacitor elements.

7. The plasma focus apparatus of claim 6, wherein the collector plates and conductive conduits are composed of a conductive material including copper, chromium, steel and nickel, and alloys and combinations thereof.

8. The plasma focus apparatus of claim 6, wherein a central axis of the inner electrode defines a long axis of the plasma focus apparatus; and wherein the first and second collector plates are spaced apart along the long axis of the plasma focus apparatus and define a spark gap region therebetween.

9. The plasma focus apparatus of claim 7, wherein the spark gap switch is disposed in the spark gap region, between the first and second collector plates.

10. The plasma focus apparatus of claim 1, wherein the at least one working gas is a gas or a gas mixture including one or more noble gases such as Argon, Krypton and Xenon.

11. The plasma focus apparatus of claim 1, wherein, the at least one working gas is a gas or a gas mixture including deuterium or a deuterium-tritium gas.

12. The plasma focus apparatus of claim 1, wherein the at least working gas supplied to the vacuum chamber through the gas supply conduit is supplied as a low-pressure gas having a pressure in a range from 0.1 Torr to 15 Torr.

13. The plasma focus apparatus of claim 1, wherein the plurality of capacitor elements are at least twenty cylindrical capacitors that are symmetrically arranged about the inner electrode in a circular pattern.

14. The plasma focus apparatus of any one of claim 2, wherein the plurality of outer electrode is six electrode rods that are symmetrically disposed about the inner electrode in a circular pattern.

15. The plasma focus apparatus of claim 1, wherein the at least one outer electrode defines a cathode of the electrode assembly, and the inner electrode defines an anode of the electrode assembly.

* * * * *